United States Patent [19]

Monereau et al.

[11] Patent Number: 6,030,435
[45] Date of Patent: Feb. 29, 2000

[54] REGULATION OF A PSA PROCESS

[75] Inventors: Christian Monereau, Paris; Dominique Rouge, Malakoff; Nathalie Derive, Paris; Christophe Montfort, Buc, all of France

[73] Assignee: L'Air Liquide, Societe Anonyme Pour L'Etude et L'Exploitation des Procedes Georges Claude, Paris Cedex, France

[21] Appl. No.: 09/120,313

[22] Filed: Jul. 22, 1998

[30] Foreign Application Priority Data

Jul. 25, 1997 [FR] France .................................. 97 09513

[51] Int. Cl.[7] .................................................. B01D 53/047
[52] U.S. Cl. ........................ 95/14; 95/19; 95/96; 95/130; 96/112; 96/113; 96/130; 96/144
[58] Field of Search .................................... 95/14, 19, 21, 95/23, 96–98, 100–105, 130; 96/112–114, 130, 144

[56] References Cited

U.S. PATENT DOCUMENTS

| | | | |
|---|---|---|---|
| 3,140,933 | 7/1964 | McKee | 95/130 |
| 3,923,477 | 12/1975 | Armond et al. | 95/130 X |
| 3,973,931 | 8/1976 | Collins | 95/130 X |
| 4,496,376 | 1/1985 | Hradek | 96/112 |
| 4,793,832 | 12/1988 | Veltman et al. | 95/14 |
| 4,927,434 | 5/1990 | Cordes et al. | 96/112 X |
| 5,169,413 | 12/1992 | Leavitt | 96/130 X |
| 5,199,964 | 4/1993 | Gräff | 95/14 |
| 5,258,056 | 11/1993 | Shirley et al. | 95/97 X |
| 5,407,465 | 4/1995 | Schaub et al. | 95/14 |
| 5,529,607 | 6/1996 | Tan | 95/130 X |
| 5,632,802 | 5/1997 | Grgich et al. | 95/14 X |
| 5,658,370 | 8/1997 | Vigor et al. | 95/96 |
| 5,711,787 | 1/1998 | Neill et al. | 95/130 X |
| 5,733,359 | 3/1998 | Doong et al. | 95/130 X |
| 5,876,485 | 3/1999 | Andreani | 95/23 |

FOREIGN PATENT DOCUMENTS

| | | | |
|---|---|---|---|
| 62-065716 | 3/1987 | Japan | 95/23 |
| 63-080823 | 4/1988 | Japan | 95/14 |
| 6-254334 | 9/1994 | Japan | 95/14 |

*Primary Examiner*—Robert Spitzer
*Attorney, Agent, or Firm*—Young & Thompson

[57] ABSTRACT

A PSA process for the separation of a gas flow containing essentially oxygen and nitrogen by preferential adsorption of the nitrogen, at a high adsorption pressure, on at least one bed of adsorbent material inserted in at least one separation zone. The material preferentially adsorbs nitrogen. Each bed of adsorbing material is subjected to successive separation cycles. Each separation cycle comprises at least: a purge phase comprising a desorption of the nitrogen adsorbed on the adsorbing material at a low desorption pressure below the high adsorption pressure, and a supply phase comprising introduction of the gaseous flow at a supply temperature ($T_{sup}$) into the separation zone with passage from the low desorption pressure to the high adsorption pressure. The supply temperature ($T_{sup}$) of the gaseous flow to be separated is regulated and the high adsorption pressure is adjusted.

14 Claims, No Drawings

REGULATION OF A PSA PROCESS

CROSS REFERENCE TO RELATED APPLICATION

This application corresponds to French application 9709513 of Jul. 25, 1997, the disclosure of which is incorporated herein by reference.

The invention relates to a process of the PSA type for the separation of a gaseous flow containing essentially oxygen and nitrogen, such as air, by preferential adsorption of the nitrogen on an adsorbent material, such as a zeolite, so as to produce oxygen or a gaseous flow enriched in oxygen, which is to say impoverished in nitrogen.

BACKGROUND OF THE INVENTION

Oxygen is a gas having a high industrial interest because it has many applications in very varied technical fields: the production of steel, glass or paper, medicine, metal welding, combustion or depollution, for example.

One of the techniques used at present to produce oxygen is the so-called "PSA" (Pressure Swing Adsorption) technique. In the field of the invention there is meant by PSA processes, not only the PSA processes properly so-called, but also analogous processes, such as VSA (Vacuum Swing Adsorption) or MPSA (Mixed Pressure Swing Adsorption) processes.

According to this PSA technique, the oxygen contained in a gaseous mixture comprising essentially oxygen and nitrogen, such as air, is separated from the gaseous mixture by adsorption of the nitrogen on a material preferentially adsorbing nitrogen, said adsorption of nitrogen being carried out by pressure variation applied in the separation zone containing said adsorbent material; the oxygen which is not or only little adsorbed, is recovered at the outlet of said separation zone.

Such PSA processes have already been described often in the prior art. Schematically, a PSA process always comprises:
- a selective adsorption step of the nitrogen on an adsorbent material, at a so-called "high pressure" of adsorption;
- a desorption step of the nitrogen trapped by the adsorbent, at a desorption pressure below the adsorption pressure, called a "low pressure";
- a repressurization step of the separation zone comprising the adsorbent, by passage from the low pressure to the high pressure; and the oxygen product being recovered during the desorption phase of the nitrogen.

From this, it will be easy to see that the efficiency of separation of the gaseous mixture depends on numerous parameters, such as the high pressure, the low pressure, the type of adsorbent material and the affinity of the latter for the compounds to be separated, the composition of the gaseous mixture to be separated, the adsorption temperature of the mixture to be separated, the size and shape of the adsorbent balls, the composition of these balls and the temperature gradient established within the bed of adsorbent, for example.

Until now, no law of general behavior has however been able to be determined, because it is very difficult to connect the different parameters to each other.

Thus, U.S. Pat. No. 3,140,933 discloses a PSA process using a type X zeolite exchanged with lithium, but does not indicate either the supply temperature or within which preferred ranges of adsorption pressure (high pressure) and desorption pressure (low pressure) it is desirable to work.

Similarly, EP-A-0667183 discloses a PSA process using a type X zeolite exchanged 50–95% with lithium cations, 4–50% with trivalent cations. There again, no preferred range of supply temperature, of adsorption pressure or of desorption pressure is indicated.

There exist on the other hand references more or less contradictory having regard to the temperature parameter.

Thus, U.S. Pat. No. 3,973,931 discloses a PSA process in which the temperature variations within the adsorbent bed are accentuated by heating of said bed by means of an external heat source.

Conversely, U.S. Pat. No. 5,169,413 discloses a PSA process, in which the bed of adsorbent is cooled to a temperature below the ambient temperature by means of an internal refrigeration system. The teaching of this document is hence contradictory to that of the preceding one.

Moreover, other documents emphasize the necessity of proceeding with a regulation of the PSA process over time.

Thus, U.S. Pat. No. 5,529,607 discloses a PSA process comprising at least two adsorbent beds, in which there is periodically determined an absolute difference between the oxygen concentration in the nitrogen desorbed from one of the beds and the oxygen concentration in the nitrogen desorbed from the other bed, and there is periodically adjusted the duration and time of purging, so as to reduce said absolute difference, the period being defined relative to a predetermined duration or to a maximum concentration of oxygen in the nitrogen.

Furthermore, U.S. Pat. No. 5,407,465 teaches a PSA process comprising at least two adsorbent beds, which is regulated as a function of the determination of the variations of the temperature profile within the adsorbent beds; this process permits eliminating the problems of purging and of excessive or insufficient duration.

Furthermore, U.S. Pat. No. 5,258,056 proposes a PSA process whose regulation is carried out by determination of a reference signal and comparison of the latter with a predetermined value, such as to derive a valve control signal adapted to regulate the supply flow of gas entering the system.

However, none of these documents permits solving the problem imposed by variations of ambient temperature on the performance of a PSA unit; ambient air being, in the context of the present invention, the air contained within a building or an enclosure that can be heated or not, or external air, which is to say under atmospheric conditions, taken as such or if desired pretreated.

Thus, it is known that the suction temperature of the machine, which is to say the temperature of ambient air sucked in by the compressor supplying the adsorber or adsorbers, varies considerably as a function of the time of year, which is to say the season, of the geographic location in which the PSA unit is installed and, more generally, of the climate prevailing on site.

However, such intake temperature fluctuations give rise to important variations of the performance of the PSA unit in the course of the year, the latter being more or less degraded according to the ambient temperature.

A solution to overcome this problem of fluctuation of intake temperature could consist in controlling the supply temperature, which is to say the temperature of the air introduced to within the adsorbers, by placing for example one or more heat exchangers between the source of compression of air and the adsorbers, so as to reheat or, as the case may be, to cool the intake air already reheated during compression and thereby to ensure the introduction, within the adsorbers, of air at a controlled supply temperature.

However, it has been observed that the control of supply temperature alone, remains insufficient, given that the intake temperature of the air supplying the compressor affects the quantity of material, which is to say the quantity of gas introduced into the adsorbers and, as a result, the pressures prevailing in the adsorbers and, correspondingly, the performance of the PSA process overall.

In other words, the quantity of air taken in by the compressor, when the ambient temperature is below 0° C., for example, is not equal to that taken in by the compressor when the ambient temperature is about 30° C., for example, everything else being equal.

OBJECT OF THE INVENTION

The object of the present invention is hence to solve this problem of random variations in performance of the PSA process due to fluctuations of the ambient temperature, by providing a regulation system permitting maintaining substantially equivalent the performances of the PSA processes, preferably VSA, and this no matter what the intake temperature of the air, which will be easy to practice on an industrial scale and which permits reducing the costs of production of oxygen.

SUMMARY OF THE INVENTION

The present invention thus relates to a PSA process for the separation of a gaseous flow comprising essentially oxygen and nitrogen, by preferential adsorption of the nitrogen, at a high adsorption pressure, on at least one bed of adsorbent material inserted in at least one separation zone, said material adsorbing preferentially the nitrogen, each bed of adsorbent material being subjected to successive separation cycles, each separation cycle comprising at least:

a supply phase comprising an introduction of the gaseous flow at a supply temperature ($T_{sup}$) into the separation zone with passage from the low desorption pressure to the high adsorption pressure, a purge phase comprising a desorption of the nitrogen adsorbed on said adsorbent material at a low desorption pressure below said high adsorption pressure, characterized in that it comprises moreover a regulation of the supply temperature ($T_{sup}$) of the gaseous flow, such as air, to be separated and an adjustment of the high adsorption pressure.

According to the selected embodiment, the process of the invention can include one or several of the following characteristics:

adjustment of the high adsorption pressure is carried out by introduction, into the supply phase, of a dead time of variable duration X, the high pressure is maintained substantially equal to a predetermined reference pressure value, the supply temperature $T_{sup}$ is maintained substantially equal to a predetermined reference temperature value, an initial dead time of a duration Xo is selected such that:

$$Xo = d \cdot \left( \frac{T_{sup}max}{T_{sup}o} - 1 \right)$$

in which:

d is the duration of supply of the separation zone with gaseous flow to be separated, $T_{sup}$max is the maximum supply temperature (in K) of the gas flow at which the PSA unit is to be operated on the site in question, and $T_{sup}$o is the mean supply temperature (in K) of the gas flow on the site in question, the high adsorption pressure is comprised between $10^5$ Pa and $10^6$ Pa, preferably of the order of $1.4 \times 10^5$ Pa, the supply temperature ($T_{sup}$) is comprised between 10° C. and 60° C., preferably between 25° C. and 45° C., the maximum supply temperature ($T_{sup}$max) is comprised between 288K and 333K, the mean supply temperature ($T_{sup}$o) is comprised between 273K and 303K, the duration (d) of supply is below or equal to 45 seconds, the gas flow to be separated is air, the adsorbent material is selected from zeolites of type X or A, and preferably said zeolite comprises at least 50% of $AlO_2$ associated with cations selected from the group consisting of the cations calcium, lithium, zinc, copper, manganese, magnesium, nickel or any alkali or alkaline earth metal.

The invention moreover relates to a device adapted to practice a PSA process for the separation of a gas flow containing essentially oxygen and nitrogen, such as the process described above, comprising means for regulating the supply temperature ($T_{sup}$) and means for adjusting the high adsorption pressure.

Preferably, the device comprises also control means permitting adjusting the supply temperature ($T_{sup}$) about a predetermined reference temperature value and/or the duration of the dead time X about a predetermined reference value of duration.

Preferably, the device of the invention comprises 1 to 3 separation zones or adsorbers.

DETAILED DESCRIPTION OF THE INVENTION

The present invention will now be described in greater detail by the help of examples given by way of illustration, but not limiting the invention.

EXAMPLES

The results given in the following examples have been simulated (idiomatic mode) with the help of a suitable simulation program.

The program used for the simulation relies on the principles of conservation of mass, conservation of enthalpy, conservation of the quantity of movement and uses the model of the linear driving force (see "Principles of Adsorption and Adsorption Processes", John Wiley & Sons, 1984; D. M. Ruthven, pp. 242–243; or "Pressure Swing Adsorption", VCS Publishers, 1994, pp. 58–61) for the evaluation of the kinetics of the solid-gas transfers within the mass of adsorbent. Such simulation models are particularly described in Pressure Swing Adsorption, Ruthven, Farooq et Knaebel, VCH Publishers, 1994, pages 172–209; and in Fluid Flow Through Packed Columns, S. Ergun, Chem. Engr. Prog., 48(2), 89(1952). The solution of the equations can be carried out for example by means of the DIVPAG program of the International Mathematical and Statistical Library sold by Microsoft™; or by the ADSIM program sold by Aspentech™. Those skilled in the art are quite able to select a suitable simulation program from among numerous programs available on the market and to introduce the preceding data therein. If needed, reference could also be had to the article by D. G. Hartzog and S. Sircar; Adsorption, 1, 133–151 (1995), Sensitivity of PSA Process Performance to Input Variables, describing a similar program.

In all the following examples, the gaseous mixture to be separated containing essentially oxygen and nitrogen is air.

The economic performances of the PSA process of the invention have been evaluated in the same way for all the following examples, which is to say by simulation and by using the following equations.

The specific energy index (ES) is given by the following formula (at 20° C., for a relative humidity of 70%):

$$ES = \frac{\left(1 - \frac{R}{t} \cdot 0.2096 + 0.0166\right) \cdot \int_{cycle} \cdot KW(\Delta P) \cdot dt}{(R \cdot 0.2096) \cdot \int_{cycle} Q(\Delta P) \cdot \frac{P_{sup} \cdot 273 \cdot dt}{1.013 \cdot T_{sup}}} \cdot \left[\frac{1}{0.95 \cdot 0.98}\right]$$

$\Delta P$ is the pressure difference between the supply pressure ($P_{sup}$) and the output pressure ($P_{out}$) of the machines, which is to say the vacuum pump and the air compressor.

The pressure drop used for the computation is from 1500 Pa (to $10^5$ Pa) at the intake of the air compressor, from 4000 Pa (to $10^5$ Pa) at the air compressor output, from 2000 Pa (to $10^5$ Pa) at the intake of the vacuum pump and from 1500 Pa (to $10^5$ Pa) at the output of the vacuum pump;

Kw is the instantaneous shaft power and Q is the instantaneous flow rate of the machines; these values are given by the technical characteristics of said machines;

the motor output is 95%;

the transmission output is 98%;

$T_{sup}$ is the air supply temperature, which is to say the temperature of the air entering the machine.

The investment index ($I_2$) is computed from a reference investment index ($I_1$) and is given by the following formula:

$$I_2 = \sum_{i=1}^{12} (C1, i) \cdot \frac{(Y2, i)^{\alpha i}}{(Y1, i)^{\alpha i}}$$

in which:

$$\sum_{i=1}^{12} (C1, i) = I_1$$

is the reference investment calculated from the different cost items indicated in the Table 1 hereafter.

Y2, i and Y1, i are the cost parameters indicated in Table 1.

$\alpha i$ represents the extrapolation power, which takes account of the economies enjoyed for each cost item (cf. Table 1).

TABLE I

| SPENDING ITEM | COST | α1 | Yi |
|---|---|---|---|
| VALVES, ARMATURES, ADSORBER, SUPPORTS | C0.1 | α1 | volume of the adsorbers |
| ADSORBENT | C0.2 | α2 | productivity price of the sieve |
| VALVES | C0.3 | α3 | output |
| VACUUM PUMP | C0.4 | α4 | vacuum pump flow rate |
| AIR COMPRESSOR AT THE INPUT OF THE PSA | C0.5 | α5 | compressor flow rate |
| OXYGEN COMPRESSOR AT | C0.6 | α6 | — |

TABLE I-continued

| SPENDING ITEM | COST | α1 | Yi |
|---|---|---|---|
| THE OUTLET OF THE PSA | | | |
| REGULATION, CONTROL, AUTOMATION | C0.7 | α7 | — |
| ENGINEERING | C0.8 | α8 | — |
| TRANSPORTATION | C0.9 | α9 | volume of the adsorbers |
| INSTALLATION AND START UP | C0.10 | α10 | volume of the adsorbers |
| GENERAL COSTS | C0.11 | α11 | — |
| MISCELLANEOUS | C0.12 | α12 | — |

The cost index of oxygen ($C_{o2}$) is evaluated by means of the following formula:

$$C_{o2} = \frac{ES \times Pe + CC \times I}{Pan}$$

in which

ES is the specific energy index;

I is the investment index;

Pe is the average price of energy (electricity . . . );

CC is a cost parameter including depreciation of the installation and maintenance;

Pan is the annual production of oxygen product.

In the following examples, the study of the performances of the PSA process has been carried out for a given cycle and with constant machines.

The cycle used has a total duration of 2×37 seconds (2 adsorbers operating in parallel) and can be schematized in the following manner:

a production phase properly so-called, to a high pressure of the order of $1.4 \times 10^5$ Pa, which is to say for adsorption of nitrogen and recovery of oxygen, taking place for 5-(X/2) seconds;

a production and elution phase for 10 seconds;

a low countercurrent equilibrium phase for 7 seconds;

a purge phase to low pressure, of the order of $0.4 \times 10^5$ Pa, which is to say for desorption of nitrogen trapped by the adsorbent bed and evacuation of said nitrogen, which purge takes place for 20 seconds;

an elution phase for 10 seconds;

a high countercurrent equilibrium phase for 7 seconds;

a variable dead time of duration X (in seconds) (wherein $0 \leq X < 10$ seconds);

a recompression phase, which is to say for passage from the low pressure to the high pressure for a new separation cycle, taking place for 15-(X/2) seconds.

The equilibrium phases correspond to placing two adsorbers (flasks) into communication, with each other, when they are at different pressures.

The differential simulations have been carried out in constant machines, which is to say volumetric machines (air pump . . . ) have been selected so as to supply high and low pressures, respectively, of $1.4 \times 10^5$ Pa and $0.4 \times 10^5$ Pa, under standard conditions, namely for an air supply temperature of 20° C. ($T_{sup}$) and an air feed temperature to the adsorbers of 35° C. ($T_{feed}$). The supply temperature of 20° C. ($T_{sup}$) corresponds in fact to the mean temperature of a temperate region such as Europe.

Thus, there can be evaluated with precision the operation under real conditions of a given PSA unit, as a function of the conditions at the site of its installation.

The adsorbent materials used in the following examples are, as the case may be, either:

- a zeolite of type X comprising about 86% of $AlO_2$ associated with lithium cations (hereafter: LiX); or
- a zeolite of type A comprising about 80% of $AlO_2$ associated with cations of calcium (hereafter: CaA).

These adsorbent materials are inserted in the form of a single bed within the two adsorbers operating in parallel, which is to say that when one of the adsorbers is in production phase, the other is in purge or recompression phase. Such zeolites are currently available in commerce.

So as to study the variations of performances of this PSA process (more precisely VSA), with each of these two adsorbent materials, as a function of the temperature of the supply air ($T_{sup}$), which is to say the temperature of ambient air supplying the air compressor, the supply temperature is caused to vary within the range −10° C. to 35° C. in different cases of regulation:

- case 1: regulation of the high pressure of the cycle to $1.4 \times 10^5$ Pa by introduction of a dead time (X>0), and regulation of the feed temperature of the adsorber to 35° C.;
- case 2: regulation of the high pressure of the cycle permanently to $1.4 \times 10^5$ Pa by introduction of a dead time (X>0), but no regulation of the feed temperature ($T_{feed}$) of the adsorber (no heat exchanger);
- case 3: regulation of the feed temperature ($T_{feed}$) of the adsorber to 35° C. (presence of a heat exchanger between the compressor and the adsorber), but no regulation of the high pressure of the cycle because of the absence of a dead time (X=0);
- case 4: no regulation of the VSA unit.

When there is no regulation of the feed temperature ($T_{feed}$) of the compressed air introduced into the adsorbers, the latter establishes a value equal to the supply temperature ($T_{sup}$) of the ambient air drawn in by the supply machine augmented by the temperature elevation engendered by the passage of said air through said feed machine (compressor for example).

Similarly, when there is no regulation of the high pressure of the cycle, the latter establishes a value resulting from the equilibrium between the quantity of material (air) introduced into the adsorber and the quantity of material (in particular nitrogen) adsorbed by the molecular sieve.

The regulation of the high pressure of the cycle to $1.4 \times 10^5$ Pa by introduction of a dead time causes, according to the case, a high or low, in the course of the time of duration X of said dead time, which is necessarily greater than or equal to 0 (X≧0). In our examples, the high pressure regulation takes the following form:

$Xo=A$ $Xn+1 = Xn \cdot (1 + a \cdot ((Phn/Phc)-1))$ wherein:
- Xn: dead time of the cycle n;
- Xn+1: dead time of the cycle n+1;
- A: value of the initial dead time Xo;
- Phn: high pressure of cycle n;
- Phc: reference high pressure;
- a: gain of regulation.

Tables II to V hereafter permit visualizing the development of the performances of a PSA unit as a function of the supply temperature ($T_{sup}$) and of the type of regulation used: high pressure and/or feed temperature ($T_{feed}$) (cases 1 to 4); the results being given in indices relative to a supply temperature of 20° C.

EXAMPLE 1

This example has been carried out with supply temperatures of −10, 0, +20 and +35° C., and with or without regulation of the high pressure of the PSA cycle and/or of the feed temperature of the adsorber. The value of Xo is here fixed at 1.5 seconds.

The results obtained and recorded in Tables II to V are given in indices, which is to say that they show the fluctuations of the PSA process according to the given type of regulation (cases 1 to 4).

TABLE II

| $T_{sup} = -10°$ C. | Case 1 | Case 2 | Case 3 | Case 4 |
|---|---|---|---|---|
| Regulation of high pressure to $1.4 \times 10^5$ Pa (wherein Xo = 1.5 seconds) | yes | yes | no | no |
| Regulation $T_{feed} = 35°$ C. | yes | no | yes | no |
| Index of production flow rate | 99 | / | 108 | / |
| Index of specific energy | 101 | / | 106 | / |
| Index of high pressure | 101 | / | 123 | / |
| Index of low pressure | 102 | / | 111 | / |

/: undetermined.

TABLE III

| $T_{sup} = 0°$ C. | Case 1 | Case 2 | Case 3 | Case 4 |
|---|---|---|---|---|
| Regulation of high pressure to $1.4 \times 10^5$ Pa (wherein Xo = 1.5 seconds) | yes | yes | no | no |
| Regulation $T_{feed} = 35°$ C. | yes | no | yes | no |
| Index of production flow rate | 100 | 97 | 104 | 94 |
| Index of specific energy (Es) | 100 | 97 | 104 | 98 |
| Index of high pressure | 100 | 99 | 115 | 95 |
| Index of low pressure | 101 | 103 | 107 | 104 |

TABLE IV

| $T_{sup} = 20°$ C. | Case 1 | Case 2 | Case 3 | Case 4 |
|---|---|---|---|---|
| Regulation of high pressure to $1.4 \times 10^5$ Pa (wherein Xo = 1.5 seconds) | yes | yes | no | no |
| Regulation $T_{feed} = 35°$ C. | yes | no | yes | no |
| Index of production flow rate | 100 | 100 | 100 | 100 |
| Index of specific energy (Es) | 100 | 100 | 100 | 100 |
| Index of high pressure | 100 | 100 | 100 | 100 |
| Index of low pressure | 100 | 100 | 100 | 100 |

TABLE V

| $T_{sup} = 35°$ C. | Case 1 | Case 2 | Case 3 | Case 4 |
|---|---|---|---|---|
| Regulation of high pressure to $1.4 \times 10^5$ Pa (wherein Xo = 1.5 seconds) | yes | yes | no | no |
| Regulation $T_{feed} = 35°$ C. | yes | no | yes | no |
| Index of production flow rate | 101 | 96 | 96 | 99 |
| Index of specific energy (Es) | 101 | 109 | 99 | 107 |
| Index of high pressure | 100 | 101 | 92 | 107 |
| Index of low pressure | 99 | 92 | 95 | 96 |

It will be clearly seen from Tables II to V that a regulation carried out only on the feed temperature ($T_{feed}$) of the adsorbers or only on the high pressure, does not suffice to compensate the large fluctuations in performance of the PSA unit, namely of the indices of flow, of production and of specific energy (Es), due to the variations of the supply temperature: −10° C. to +35° C. adapted to be encountered at the production site during a complete year.

Conversely, a double regulation, both of the feed temperature ($T_{feed}$) of the adsorbers and the high pressure used, it will be seen to be quite effective and permits maintaining substantially constant the performances of the PSA unit, no matter what the supply temperature, which is to say the temperature of the ambient air.

However, it must be emphasized that the performances obtained by this double regulation are entirely surprising and unexpected, given that they go beyond an addition of the two regulations considered independently of each other. Thus, there results in the absence of any regulation, as is evident from case 4, an increase in the high pressure of the cycle when the supply temperature increases. In view of this and to overcome this undesired increase in the high pressure, one skilled in the art would tend to increase the duration of the dead time (X) when the feed temperature ($T_{feed}$) increases.

However, the use of the double regulation mentioned above leads to an exactly opposite solution, namely, a decrease of the duration of the dead time (X) when the feed temperature increases. Thus, the regulation of the feed temperature bears on the quantity of material, in particular the quantity of nitrogen, adsorbed and, as a result, changes with the duration of the dead time X, the equilibrium between the gas phase and the adsorbed phase and hence also the high adsorption pressure at the end of the production phase.

It surprisingly results that the combination of the two regulations, namely, regulation of feed temperature and high pressure, permits ensuring the equilibrium of the PSA process, no matter what the supply temperature, so as to obtain substantially constant flow rate and specific energy.

EXAMPLE 2

This example seeks to determine an optimum value of the dead time Xo, an initial value of the dead time, which is to say under standard conditions defined by $T_{sup}=T_{sup}o$. This value must correspond to a regulation of a PSA process under real conditions, which is to say no matter what the supply temperature and/or the ambient temperature during the greater part of the year.

Accordingly, so as to be able to maintain the performance of the PSA process substantially constant in the course of time, which is to say the same for high supply temperatures (in summer) or low supply temperatures (in winter), it may be necessary, in view of the results of Example 1, to provide an over-dimensioning of the feed machines (compressors . . . ), which is to say to ensure the presence of a dead time Xo of a duration not zero under standard conditions ($T_{sup}=T_{sup}o$). Thus, as soon as $T_{sup}$ is greater than $T_{sup}o$, the dead time X starting from Xo will tend to diminish, as shown in Example 1.

In other words, it is important to effect an economic compromise between, on the one hand, the price of the PSA unit under standard conditions (particularly the cost of the oxygen product) and, on the other hand, the flexibility and performance of said unit in a changing environment, which is to say with a supply temperature varying in the course of time.

Tables VI and VII show clearly the influence of the length of the dead time Xo under standard conditions on the cost of the oxygen produced and the performance of the PSA unit, showing a double adjustment: high pressure and feed temperature.

Table VI shows the results obtained for a value of Xo of 1.5 sec. under standard conditions (20° C.) and Table VI shows those obtained for value Xo of 0 sec. under standard conditions (with $T_{sup}o=20°$ C.).

TABLE VI

| $T_{sup}$ (in ° C.) | −10 | 20 | 35 |
|---|---|---|---|
| Length of dead time X (in sec.) | 4 | 1.5 | 0.1 |
| Regulation $T_{feed}$ (in ° C.) | 35 | 35 | 35 |
| Index of production flow rate | 99 | 100 | 101 |
| Index of specific energy (Es) | 101 | 100 | 101 |
| Index of cost of oxygen produced | 101 | 100 | 101 |

TABLE VII

| $T_{sup}$ (in ° C.) | −10 | 20 | 35 |
|---|---|---|---|
| Length of dead time X (in sec.) | 2.2 | 0 | 0 |
| Regulation $T_{feed}$ (in ° C.) | 35 | 35 | 35 |
| Index of production flow rate | 100 | 100 | 93 |
| Index of specific energy (Es) | 101 | 100 | 111 |
| Index of cost of oxygen produced | 98 | 98 | 106 |

It will be seen that choosing a value of Xo equal to zero, under standard conditions ($T_{sup}=T_{sup}o$), leads to performances and hence to a constant cost of oxygen for supply temperatures less than or equal to $T_{sup}o$. However, the same is not true for temperatures higher than $T_{sup}o$, for which the performances and hence the cost of oxygen are substantially impaired.

An analogous observation can be made for a value of Xo of 1.5 sec., but for higher supply temperatures, which is to say substantially greater than $T_{sup}o$ (here about 35° C.).

It follows that, according to the location the PSA unit is operated, it is necessary to find a compromise between the cost of the unit and the maximum supply temperature ($T_{sup}max$) at which the PSA unit must be suited to said production site, so as to determine an optimum initial Xo for the production site where is installed the PSA unit. More particularly, the initial dead time Xo is a dead time fixed at the moment of dimensioning the PSA unit, given a supply temperature ($T_{sup}$) equal to the mean supply temperature at the site at which the PSA unit is installed.

Thus, the presence of a dead time Xo which is not zero under standard conditions implies an over-dimensioning of the PSA unit under these conditions. On the other hand, only the presence of a dead time Xo not equal to 0 permits ensuring an adaptation of the PSA unit (maintained performances) for a feed temperature greater than the standard feed temperature.

The determination of Xo can be carried out using the following formula:

$$Xo = d \cdot \left( \frac{T_{sup}max}{T_{sup}o} - 1 \right)$$

in which:
Xo is the length of the dead time of the PSA unit under standard conditions (in sec);
d is the duration (in sec) of feed of an adsorber;
$T_{sup}max$ is the maximum supply temperature (in °K.) to which can be subjected, in the course of a year, the PSA unit on the site, without decrease of performance of the PSA unit. For example, $T_{sup}max$ can be selected such that the probability over one year that the supply temperature $T_{sup}$ will be less than $T_{sup}max$, is greater than 80%;

and $T_{sup}o$ is the mean supply temperature (in °K.) at the site over the course of a year.

By operating with double regulation of the PSA process, simultaneously of the high pressure of the cycle and of the feed temperature of the adsorber or adsorbers, by introduction of a dead time of duration Xo, under standard conditions, according to the preceding formula, it is possible to maintain the performances of the PSA unit over a wide range of supply temperatures ($T_{sup}$), corresponding to at least 80% of the year, in the present case.

Moreover, it should be noted that the results obtained by using a zeolite of type LiX are in all cases equivalent to those obtained with zeolite of type CaA.

What is claimed is:

1. PSA process for the separation of a gaseous flow containing essentially oxygen and nitrogen by preferential adsorption of the nitrogen, at a high adsorption pressure, on at least one bed of adsorbent material inserted in at least one separation zone, said material preferentially adsorbing nitrogen, each bed of adsorbent material being subjected to successive separation cycles, each separation cycle comprising at least:

a feed phase comprising an introduction of the gaseous flow at a feed temperature ($T_{feed}$) into the separation zone with passage from a low desorption pressure to the high adsorption pressure, a purge phase comprising a desorption of the nitrogen adsorbed on said adsorbent material at a desorption pressure which is below said high adsorption pressure, and regulating the feed temperature ($T_{feed}$) of the gaseous flow to be separated and adjusting the high adsorption pressure.

2. Process according to claim 1, wherein the adjustment of the high adsorption pressure is carried out by introducing, into said feed phase, a dead time of a variable length X.

3. Process according to claim 1, wherein the high pressure is maintained substantially equal to a predetermined reference pressure value.

4. Process according to claim 1, wherein the feed temperature $T_{feed}$ is maintained substantially equal to a predetermined reference temperature value.

5. Process according to claim 1, wherein an initial dead time is selected to be of duration Xo wherein:

$$Xo = d \cdot \left( \frac{T_{sup}max}{T_{sup}o} - 1 \right)$$

in which:

d is the duration of feed of the separation zone with a gas flow to be separated, $T_{sup}max$ is a maximum supply temperature (in ° K.) of the gaseous flow with which a PSA unit is to be used on a given site, and $T_{sup}o$ is the mean supply temperature (in ° K.) of the gas flow at the site in question.

6. Process according to claim 5, wherein the maximum supply temperature ($T_{sup}max$) is comprised between 288K and 333K.

7. Process according to claim 5, wherein the mean supply temperature ($T_{sup}o$) is comprised between 273K and 303K.

8. Process according to claim 5, wherein the duration (d) of feed is up to 45 seconds.

9. Process according to claim 1, wherein the high adsorption pressure is comprised between $10^5$ Pa and $10^6$ Pa.

10. Process according to claim 1, wherein the feed temperature ($T_{feed}$) is comprised between 10° C. and 60° C.

11. Process according to claim 1, wherein the gaseous flow to be separated is air.

12. Device for using a PSA process for the separation of a gaseous flow containing essentially oxygen and nitrogen according to claim 1, comprising means for adjusting the feed temperature ($T_{feed}$) and means for adjusting the high adsorption pressure.

13. Device according to claim 12, which comprises moreover control means permitting regulating at least one of the feed temperature ($T_{feed}$) about a predetermined reference value of temperature or the duration of a dead time X about a predetermined reference value of duration.

14. Device according to claim 12, wherein said at least one separation zone comprises 1 to 3 separation zones.

\* \* \* \* \*